April 2, 1957   J. H. MURPHY   2,787,340
BRAKE ASSEMBLY
Filed July 14, 1955   2 Sheets-Sheet 1

INVENTOR.
JOHN H. MURPHY
BY
RICHEY, WATTS, EDGERTON & McNENNY
ATTORNEYS

April 2, 1957

J. H. MURPHY 2,787,340

BRAKE ASSEMBLY

Filed July 14, 1955

INVENTOR.
JOHN H. MURPHY.
BY
RICHEY, WATTS, EDGERTON & McNENNY
A.H. Edgerton
ATTORNEYS

United States Patent Office 2,787,340
Patented Apr. 2, 1957

2,787,340

BRAKE ASSEMBLY

John H. Murphy, Detroit, Mich., assignor to Detroit Duo-Grip Brake Corporation, Detroit, Mich., a corporation of Michigan Application July 14, 1955, Serial No. 521,953

5 Claims. (Cl. 188—76)

This invention relates broadly to vehicular brakes and more specifically to brakes of the form that embody a forked bell crank for the simultaneous actuation of the inner and outer brake shoes.

One of the objects of the invention resides in the provision of a structure which will move the shoes into engagement with the brake drum flange upon actuation of the bell crank lever and effect the positive return thereof upon countermovement of the lever.

Another object of the invention is to provide a wedge plate or cam on the inner shoe to compensate for the difference in the radial movement of the inner and outer brake shoes.

A further object of the invention resides in the provision of a structure which is economic of production, efficient in operation and designed to facilitate the renewal of the brake lining with ease and dispatch.

Other objects and advantages more or less ancillary to the foregoing, and the manner in which all the various objects are realized, will appear in the following description, which considered in connection with the accompanying drawings, sets forth the preferred embodiment of the invention.

Referring to the drawings.

Figure 1:
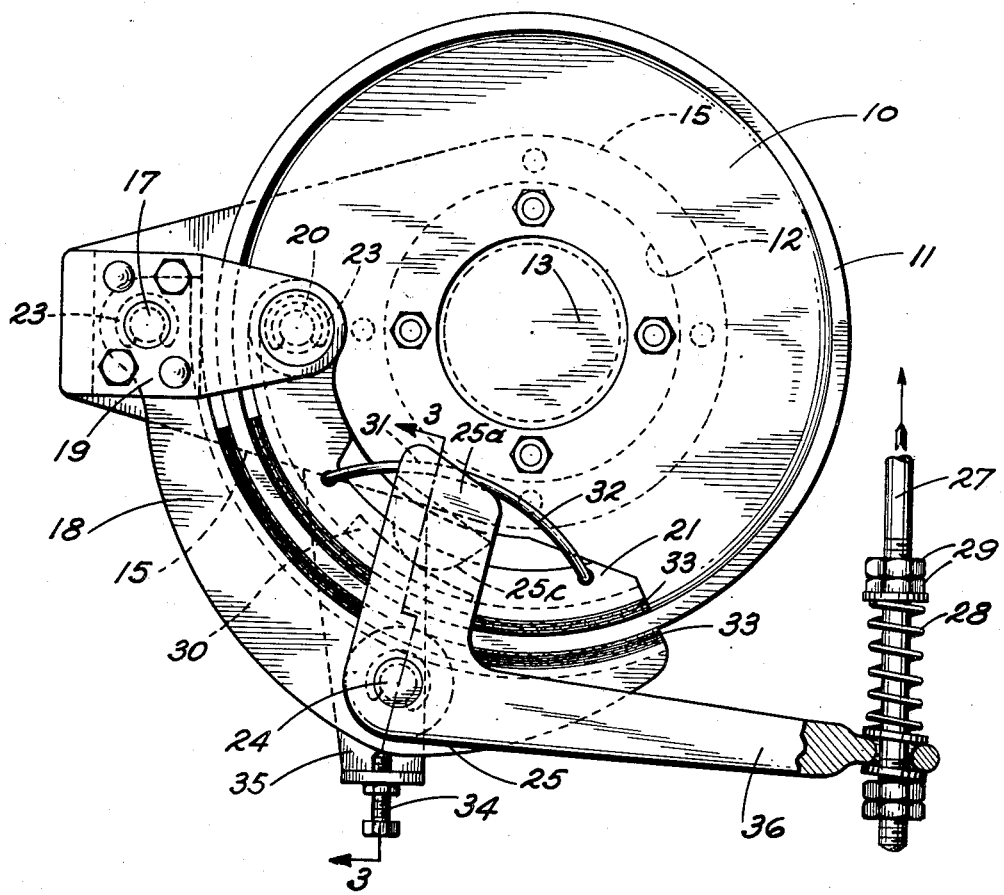
Fig. 1 is a side elevational view of a brake assembly embodying the improved brake shoes and actuating lever therefor.
Figure 2:
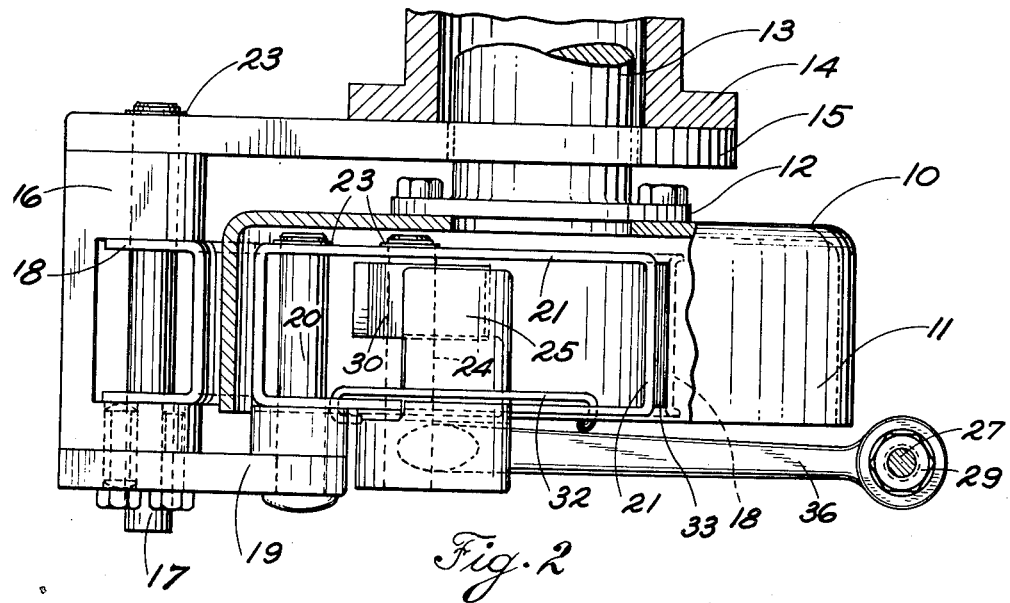
Fig. 2 is a plan view thereof, a portion of the brake drum being shown in section in the interest of clarity.
Figure 3:
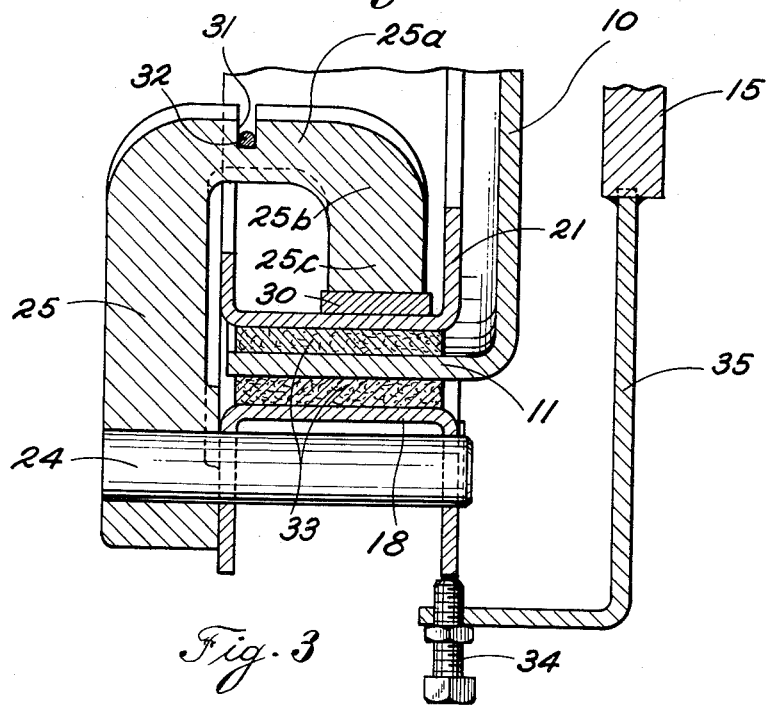
Fig. 3 is a vertical sectional view through the brake shoe actuating lever and associated parts, the section being taken on a plane indicated by the line 3—3 in Fig. 1.

Referring first to Fig. 1, the brake comprises a brake drum 10 including an annular flange 11 and a hub 12 fabricated in the usual manner to receive cap screws for the support of the drive axle 13. The axle rotates freely within a tubular housing 14 which supports a fixed arm 15 having a post 16 welded thereon for the retention of a pin 17 constituting the fulcrum for the outer brake shoe 18. The outer end of the post is provided with a plate 19 which is drilled and reamed to receive the pin 17 and dowels and cap screws, and is bored adjacent its free end for a pintle 20 constituting the fulcrum for the inner brake shoe 21. The brake shoes are preferably formed from sheet steel stock, die struck in channel form with arcuate webs conforming respectively to the inner and outer diameter of the drum flange. The flanges of the outer shoe are drilled to receive the pin 17 and the flanges of the inner shoe are machined for the reception of the pintle 20. The inner ends of the pin 17 and pintle 20 are grooved to receive snap rings 23 to restrain axial movement thereof, and the outer ends thereof, are affixed in the plate 19. The flanges of the outer shoe are drilled adjacent the free end thereof for the pivotal support of a pin 24 affixed in a bell crank 25. The bell crank, as will be seen in Figs. 1 and 3, comprises a lever drilled in its end portion to support the brake pull rod 27 retained by nuts on its outer end, and a telescopic compression spring 28 compressively held by nuts 29. The shorter arm of the bell crank is formed with a transverse leg 25a bridging the brake drum flange and having a depending arm 25b thereon terminating in a rounded lip or anvil 25c disposed for engagement with a hardened wedge plate 30 on the inner face of the web of the inner shoe 21. The end or bridge 25a of the bell crank is machined with an arcuate groove 31 in the upper face thereof for the reception of wire loop 32 anchored at each end in the outer flange of the inner brake shoe 21 and provided to lift the inner shoe when the bell crank 25 is released and lip 25c thereon is moved toward the leading edge of the cam 30. The outer flange of the inner brake shoe is cut away adjacent the free end thereof to clear the bridge 25a during the operation of the bell crank. The confronting faces of the brake shoes are provided with brake lining 33 secured thereon in the conventional manner by rivets, not shown. Running clearance between the brake lining and the brake drum flange is obtained by the spring 28 and an adjustable set screw 34 mounted in a bracket 35 depending from the arm 15.

When the lever arm 36 of the bell crank is elevated to apply the brake, the crank will oscillate about its fulcrum 24 in the outer shoe 18 pulling the pivotally supported brake shoes towards the brake drum flange. The movement of the inner shoe, though normally less than that of the outer shoe, is compensated through the action of the tapered wedge cam 30, thus relieving the servo action of the brake. Upon release of the tensive effort upon the pull rol 27, the spring 28 will effect the depression of the lever arm 36 and the outer brake shoe until movement thereof is arrested by the stop 34. As this occurs, the wire loop 32 will lift the inner brake shoe and thus restore the predetermined clearance between the brake lining on the shoes and the brake drum flange.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A vehicular brake comprising a flanged brake drum, a fixed bracket adjacent the outer face of the flange, an outer arcuate brake shoe fulcrumed thereon, an inner arcuate brake shoe pivotally supported by said bracket, a forked bell crank fulcrumed on the outer brake shoe intermediate the ends thereof, a brake pull rod connected to the long arm of said bell crank, a compression spring thereon, a transverse leg on the shorter arm of said bell crank having an arcuate groove in the outer face thereof, a depending anvil on said leg, a tapered cam on the inner face of the inner brake shoe engaged with said anvil and means on said inner brake shoe slidable in said groove in said bell crank leg for lifting the shoe when the long arm of the bell crank is depressed.

2. A vehicular brake comprising a flanged brake drum, a fixed bracket adjacent the outer face of the flange, an outer arcuate brake shoe fulcrumed thereon, an inner arcuate brake shoe pivotally supported by said bracket, a tapered cam on the inner face of said inner shoe, the high end of said cam confronting the inner shoe fulcrum, a forked bell crank fulcrumed on the outer brake shoe intermediate its ends, a brake pull rod on the long arm of said bell crank, a compression spring on said pull rod, a leg on the shorter arm of said bell crank having a groove in the outer face thereof, a depending anvil on said leg engaged with said cam, and an arcuate wire affixed to the inner brake shoe and guided in said groove for lifting the brake shoe when the anvil is moved to the low end of said tapered cam.

3. A vehicular brake comprising a flanged brake drum, a stationary bracket adjacent the outer face of the flange, a pin supported thereby, an outer brake shoe pivotally mounted on said pin, a second pin supported by said bracket, an inner brake shoe pivoted on said second pin, a wedge on the inner face of the inner shoe, a bell crank pivoted on said outer brake shoe, a transverse leg on said bell crank spanning the brake drum flange, a depending lug thereon engaged with said wedge, and lifting means on said inner shoe engaged with said leg on the bell crank.

4. A vehicular brake comprising a flanged brake drum, a fixed bracket adjacent the outer face of the flange, an outer arcuate brake shoe fulcrumed thereon, an inner arcuate brake shoe pivotally supported on said bracket, a forked bell crank fulcrumed on the outer brake shoe intermediate the ends thereof, a brake pull rod connected to the long arm of said bell crank, a compression spring thereon, a transverse leg on the shorter arm of said bell crank having an arcuate groove in the outer face thereof, a depending anvil on said leg, a tapered cam on the inner face of the inner brake shoe engaged with said anvil, means on said inner brake shoe slidable in said groove in the bell crank leg for lifting the shoe when the bell crank lever is depressed, an arm depending from said bracket and an adjustable stop thereon to delineate the depression of the long arm of said bell crank.

5. A brake for an automotive vehicle comprising a flanged brake drum, a fixed bracket terminating adjacent the circumferential face of the flange, a post thereon normal thereto, a pin mounted in said post, an outer arcuate brake shoe pivoted on said pin, a plate on the end of said post spanning the rim of the brake drum flange, a pin mounted in said plate thereon, an inner arcuate brake shoe pivoted on said second pin, a bell crank pivoted on the outer brake shoe intermediate its ends, a pull rod connected thereto for actuating the bell crank, a transverse leg on said bell crank bridging the edge of the brake drum flange and a guide on the inner brake shoe engaged with said leg on the bell crank for lifting the inner brake shoe when the bell crank is moved to release the brake.

References Cited in the file of this patent

UNITED STATES PATENTS

| 2,284,357 | Ash | May 26, 1942 |

FOREIGN PATENTS

| 455,286 | Italy | Feb. 17, 1950 |
| 650,499 | Great Britain | Feb. 28, 1951 |